United States Patent
Goldfeld (10) Patent No.: US 10,959,813 B1
(45) Date of Patent: Mar. 30, 2021

(54) TISSUE LEVEL ONE-TIME ABUTMENT SYSTEM AND METHOD

(71) Applicant: Global Implant Ltd., Tel Aviv (IL)

(72) Inventor: Liviu Goldfeld, Ramat Gan (IL)

(*) Notice: Subject to any disclaimer, the term of this patent is extended or adjusted under 35 U.S.C. 154(b) by 0 days.

(21) Appl. No.: 16/946,352

(22) Filed: Jun. 18, 2020

Related U.S. Application Data (62) Division of application No. 16/752,836, filed on Jan. 27, 2020.

(51) Int. Cl.
*A61C 8/00* (2006.01)

(52) U.S. Cl.
CPC ............ *A61C 8/008* (2013.01); *A61C 8/0056* (2013.01); *A61C 8/0089* (2013.01)

(58) Field of Classification Search
CPC ... A61C 8/0068; A61C 8/0069; A61C 8/0071; A61C 8/008; A61C 8/0056; A61C 8/006; A61C 8/0066; A61C 8/0089; A61C 8/0001; A61C 8/0087; A61C 8/0062; A61C 8/0098
See application file for complete search history.

(56) References Cited

U.S. PATENT DOCUMENTS

| | | | | |
|---|---|---|---|---|
| 5,538,428 A * | 7/1996 | Staubli | A61C 8/0087 206/63.5 |
| 5,688,123 A * | 11/1997 | Meiers | A61C 8/0001 433/172 |
| 5,964,591 A * | 10/1999 | Beaty | A61C 8/0001 433/141 |
| 6,068,480 A * | 5/2000 | Misch | A61C 8/0001 433/173 |
| 6,206,696 B1 * | 3/2001 | Day | A61C 8/008 433/141 |
| 2002/0025505 A1 * | 2/2002 | Beaty | A61C 8/0001 433/173 |
| 2006/0263747 A1 * | 11/2006 | Hurson | A61C 8/0066 433/173 |
| 2008/0280253 A1 * | 11/2008 | Augthun | A61C 8/008 433/141 |
| 2011/0306014 A1 * | 12/2011 | Conte | A61C 8/005 433/173 |
| 2014/0127645 A1 * | 5/2014 | Goldenberg | A61C 8/0089 433/174 |

(Continued)

FOREIGN PATENT DOCUMENTS

CA 2880938 2/2014
EP 2494939 A2 * 9/2012 ............. A61C 8/005

*Primary Examiner* — Jacqueline T Johanas
*Assistant Examiner* — Shannel Nicole Belk
(74) *Attorney, Agent, or Firm* — Haim M. Factor (57) ABSTRACT

A tissue level one-time abutment system for use in a dental zone to reduce a chair time, the system comprising: an abutment supporting a superstructure, the abutment comprising: an implant; a healing cap mechanically fixed to the implant by a threaded bolt extending axially through the healing cap and secured into a matching tapped socket in the implant; and a driving tool having a cross sectional shape matching an axial depression in the healing cap and the driving tool attached to the threaded bolt and having a detachable connection to the threaded bolt; wherein the abutment is configured to be inserted in an initial procedure, with the healing cap retained in place upon the implant, following the initial procedure.

2 Claims, 6 Drawing Sheets

(56) References Cited

U.S. PATENT DOCUMENTS

| | | | |
|---|---|---|---|
| 2015/0182309 A1* | 7/2015 | Soler | A61C 8/0068 433/174 |
| 2018/0325631 A1* | 11/2018 | Christiansen | A61C 8/0001 |
| 2019/0290404 A1* | 9/2019 | Thomke | A61C 8/0069 |

* cited by examiner

TISSUE LEVEL ONE-TIME ABUTMENT SYSTEM AND METHOD

FIELD OF THE INVENTION AND BACKGROUND

Embodiments of the current invention relate to preparation of a superstructure for a dental implant, in general, and specifically to a tissue level one-time abutment system and method.

In the specification and claims which follow hereinbelow, the term "abutment" is intended to mean a connecting structure that supports and holds a superstructure securely to an implant, as known in the ar.

In the practice of restorative dentistry, insertion of an implant is performed in an "initial procedure"—a term intend to mean in the specification and claims which follow, the surgical dental procedure in which the implant is surgically inserted into the patient's mouth, as known in the art. After insertion of the implant, a healing cap is mounted onto the implant (as a separate part of the initial procedure or in a subsequent procedure). The healing cap serves to support gums during a healing period. The healing cap is typically secured to the implant with the aid of a threaded axial extension of the healing cap, engaging a matching tapped socket in the implant.

Subsequently, the healing cap is typically removed and replaced by an abutment which then serves to support the dental superstructure, also referred to in the specification hereinbelow in the claims which follow as a "crown"—at term intended to also mean a "bridge", as known in the art. The abutment and the superstructure are generally prepared in a laboratory with the aid of a dental model, i.e. a model of the patient's teeth and gums in the region of the implant or group of implants-referred to hereinbelow and in the claims as a "dental region". The dental model is typically produced in the laboratory by casting gypsum into a mold prepared in the clinic by the dentist, to serve as an impression of the patient's teeth and gums in the dental region.

Figure 1:
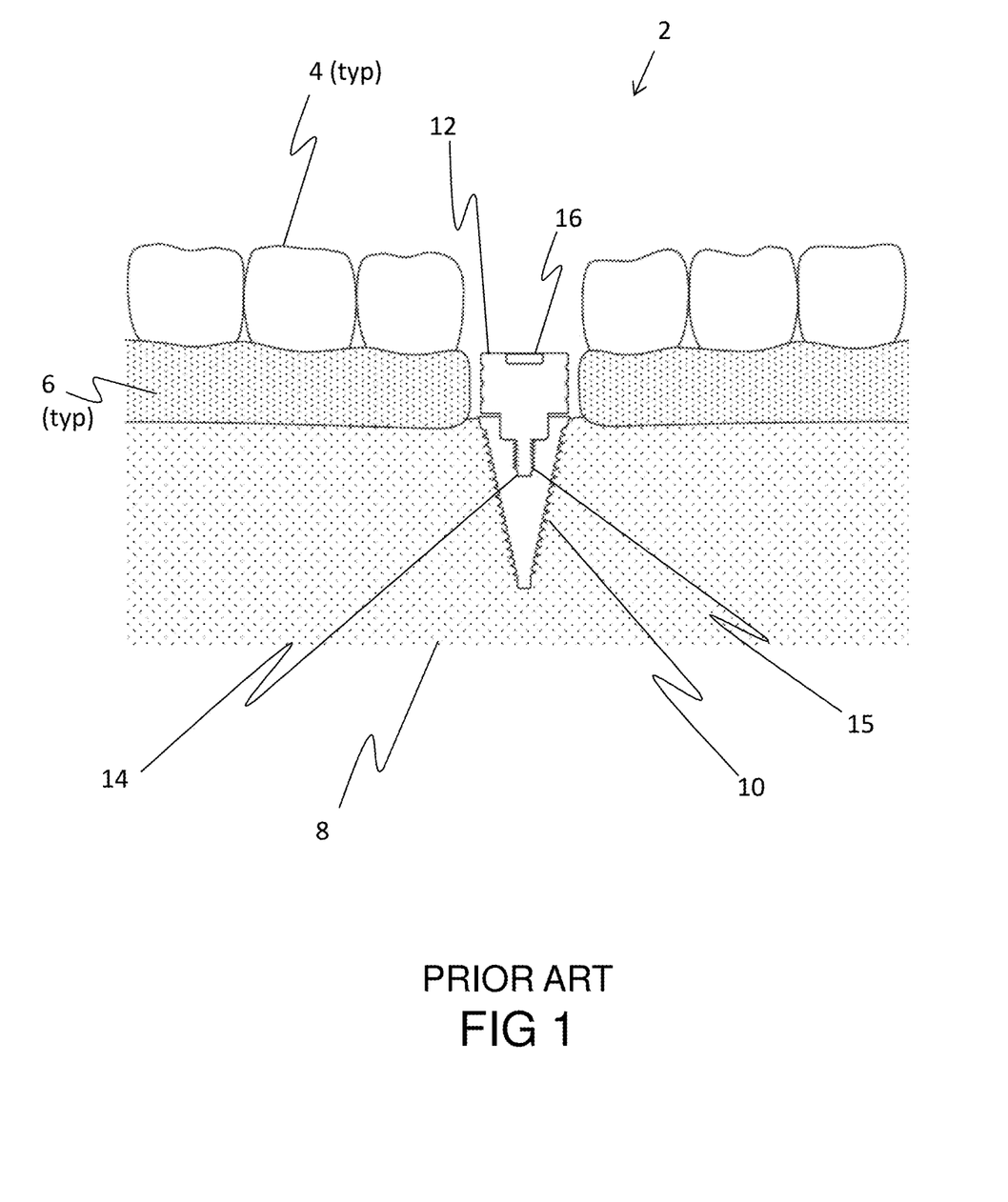
FIG. 1 is a cross-sectional schematic representation of a dental region, including: teeth; a gum; and a natural bone; and a prior art configuration of an implant, a healing cap, a threaded axial extension of the healing cap, connecting the healing cap to the implant, having a matching tapped socket; and an axial recession in the healing cap for driving the healing cap into the implant, as known in the art.

Reference is currently made to FIG. 1, which is a cross-sectional schematic representation of a dental region 2, including: teeth 4; a gum 6; and a natural bone 8; and a prior art configuration of an implant 10, a healing cap 12, a threaded axial extension 14 of the healing cap, connecting healing cap 12 to implant 10, having a matching tapped socket 15—all as described hereinabove; and an axial recession 16 in the healing cap for driving the healing cap into implant 10, as known in the art. In the specification and claims which follow, the terms "dental region" and "implant zone" are used interchangeably to indicate the specific zone/region indicated as dental region 2 in FIG. 1, and as defined hereinabove.

Subsequent figures described in the specification hereinbelow do not show the dental region, but it is to be understood that the implant and other structures, shown in subsequent figures, are all intended to be configured in the dental region and that subsequent figures are equally applicable, mutatis mutandis, whether teeth are maxillary or mandibular.

Following the initial procedure, a conventional process of taking an impression according to prior art typically proceeds as described hereinbelow. Although there may be a plurality of healing caps and implants for which an impression is taken, the following description relates to a singular implant-healing cap combination.

At some time during a healing period (typically 8-20 weeks following the initial procedure) the dentist temporarily removes the healing cap. He then attaches a transfer gauge (not shown in the current figure) to each implant, as known in the art. The transfer gauge extends beyond the tallest surrounding teeth. Subsequently an impression is taken, using suitable initially-soft material, as is known in the practice.

After the impression material hardens, the resulting hardened mold is removed, together with the transfer gauges, which are embedded in the mold and are detached from the implants when the mold is removed from the patient's mouth.

The healing cap is then replaced.

In the laboratory, an implant analog (which duplicates the shape of the implant) is temporarily attached to the end of the transfer gauge protruding from the mold and a gypsum casting is made of this combination.

After the gypsum hardens, the transfer gauge in the hardened mold is removed, leaving the implant analog in its correct place in the model (onto which an abutments or other structural elements may subsequently be mounted during laboratory work).

In recent years, a computerized dental impression process has been introduced, as an alternative to the traditional mechanical process described above. Accordingly, after the healing cap has been temporarily removed, a scan pin, as known in the art, is temporarily attached to the implant in the dental region and the dental region is scanned using an intraoral scanner, whose output is then fed to a computer for processing—as known in the art. The result of computer processing yields a digital representation (or digital model) of the dental region, including the scan pin, wherein the representation of the scan pin serves to indicate the exact position and orientation of the implant. In the laboratory the digital model is used to prepare the appropriate abutment and/or superstructure.

A salient drawback of both the conventional mechanical and computerized model preparation processes described hereinabove is that temporary removal and replacement of the healing cap is in many cases a surgical procedure of itself—requiring separation of gum tissue from the healing caps. Replacement of the healing cap involves an additional clinic visit/extra time and effort by the dentist and causes discomfort for the patient. Moreover, during the time that the caps are absent, the gums may sag—which could require a more prolonged surgical operation to restore the gums to accommodate the replaced healing cap. Furthermore, removal and replacement of the healing cap always may serve to introduce infection at the implant zone, which could lead to the eventual failure of the implant.

Overall, a major drawback in the model preparation processes and in the overall process of insertion of an implant and subsequent mounting thereon a healing cap, as described hereinabove, is that each step (specifically: insertion of the implant; mounting a healing cap; and subsequent removal and replacement of the healing cap) typically demands a separate patient visit and a dentistry procedure for each step. The "chair time" (a term used in specification and claims which follow hereinbelow, intended to mean cumulative dentistry procedure time, inferring additional time/visits a patient must spend in additional dental procedures) is increased, along with a concomitant costs and an increased risk of infection and complications to the dental region.

There is therefore a need to reduce chair time by both reducing the need for additional, separate, dentistry procedures and by modifying the structure and method of insertion of the implant and mounting the healing cap together in an initial, one-time procedure (as opposed to multi-procedures), thus contributing to reducing costs, and to increasing the success of dentistry procedures.

SUMMARY OF INVENTION

According to the teachings of the current invention, there is provided a tissue level one-time abutment system for use in a dental zone to reduce a chair time, the system comprising: an abutment supporting a superstructure, the abutment comprising: an implant; a healing cap mechanically fixed to the implant by a threaded bolt extending axially through the healing cap and secured into a matching tapped socket in the implant; and a driving tool having a cross sectional shape matching an axial depression in the healing cap and the driving tool attached to the threaded bolt and having a detachable connection to the threaded bolt; wherein the abutment is configured to be inserted in an initial procedure, with the healing cap retained in place upon the implant, following the initial procedure. Preferably, the abutment is configured to remain in place throughout any intermediate procedures and through a final procedure of installing the superstructure in place on the healing cap. Most preferably, the superstructure is one chosen from the list including: a crown and a bridge. Typically, the driving tool is configured to drive the combined healing cap and implant into place in the initial procedure. Most typically, the driving tool is further configured to be detached from the healing cap once the abutment has been inserted and the implant driven into place.

Preferably, the driving tool is disposable. Most preferably, a transfer gauge is configured to have a temporary attachment to the healing cap for a first step in an impression procedure including a hardening material. Typically, the transfer gauge is further configured to be detached from the healing cap along with removal of the hardened material.

According to the teachings of the current invention, there is further provided a method of using the tissue level one-time abutment system, the method including the steps of: providing the one-time abutment system to a clinic in a sterilized state with the driving tool attached; using the driving tool to drive the healing cap and implant into place, in the initial procedure, using the cross-sectional shape of the driving tool matching an axial depression in the healing cap; detaching the driving tool from the healing cap once the abutment is inserted and the implant is driven into place; disposing the driving tool after it is detached; temporarily attaching a transfer gauge to the healing cap for a first step in an impression procedure including hardening impression material; detaching the transfer gauge from the healing cap with removal of hardened impression material is further configured to be detached from the healing cap with removal of the hardened impression material; and retaining the abutment in place throughout any intermediate procedures and through a final procedure of installing the superstructure in place upon the abutment. Preferably, the chair time is reduced by insertion of the implant and mounting the healing cap together in a one-time procedure to reduce costs and to increase success of dentistry procedures.

LIST OF FIGURES

The invention is described herein, by way of example only, with reference to the accompanying drawings, wherein.

DETAILED DESCRIPTION

Embodiments of the current invention relate to preparation of a superstructure for a dental implant in general, and specifically to a tissue level one-time abutment system and method.

Figure 2:
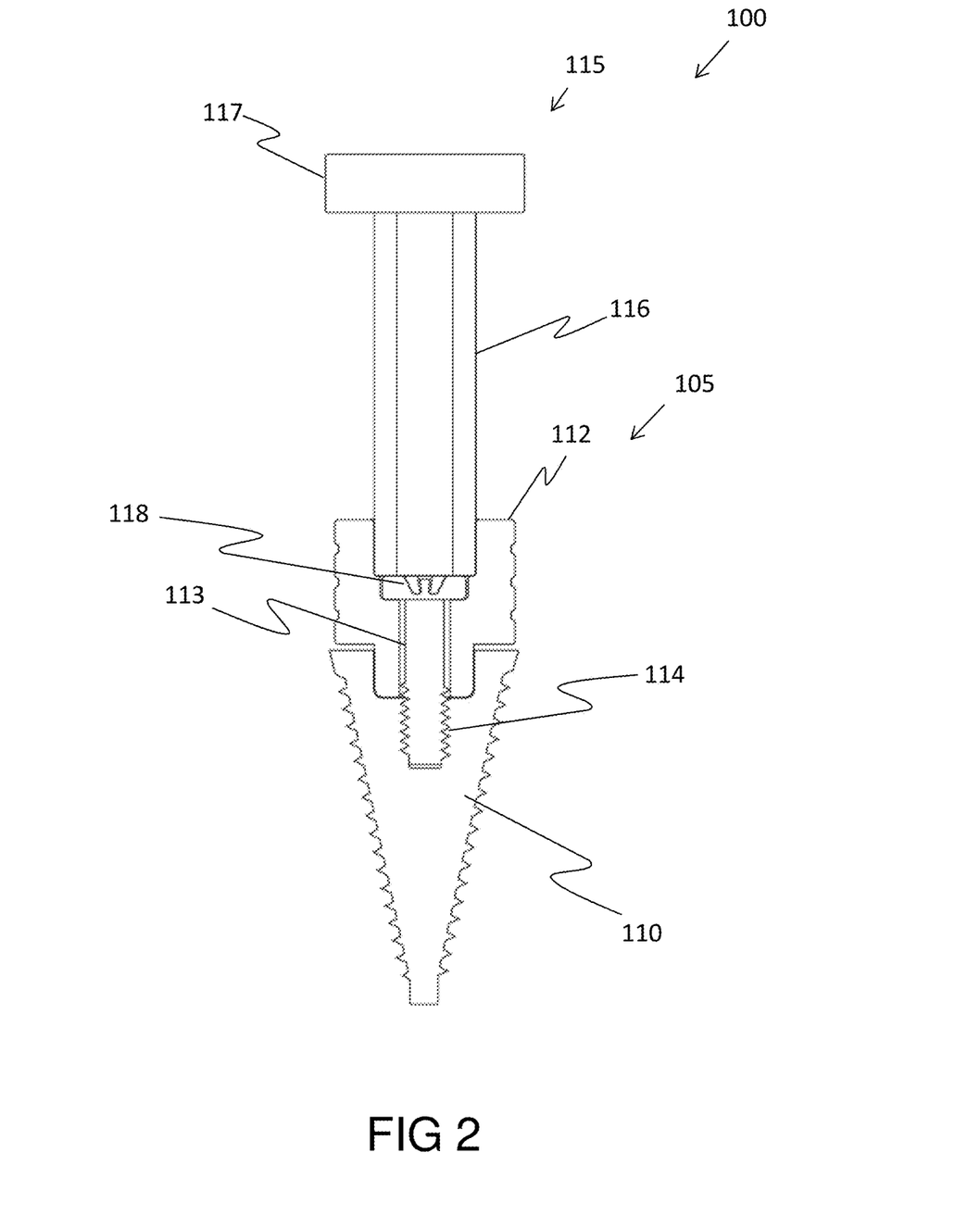
FIGS. 2 and 3 are cross-sectional, schematic representations of a one-time abutment system, in accordance with embodiments of the current invention.
Figure 3:
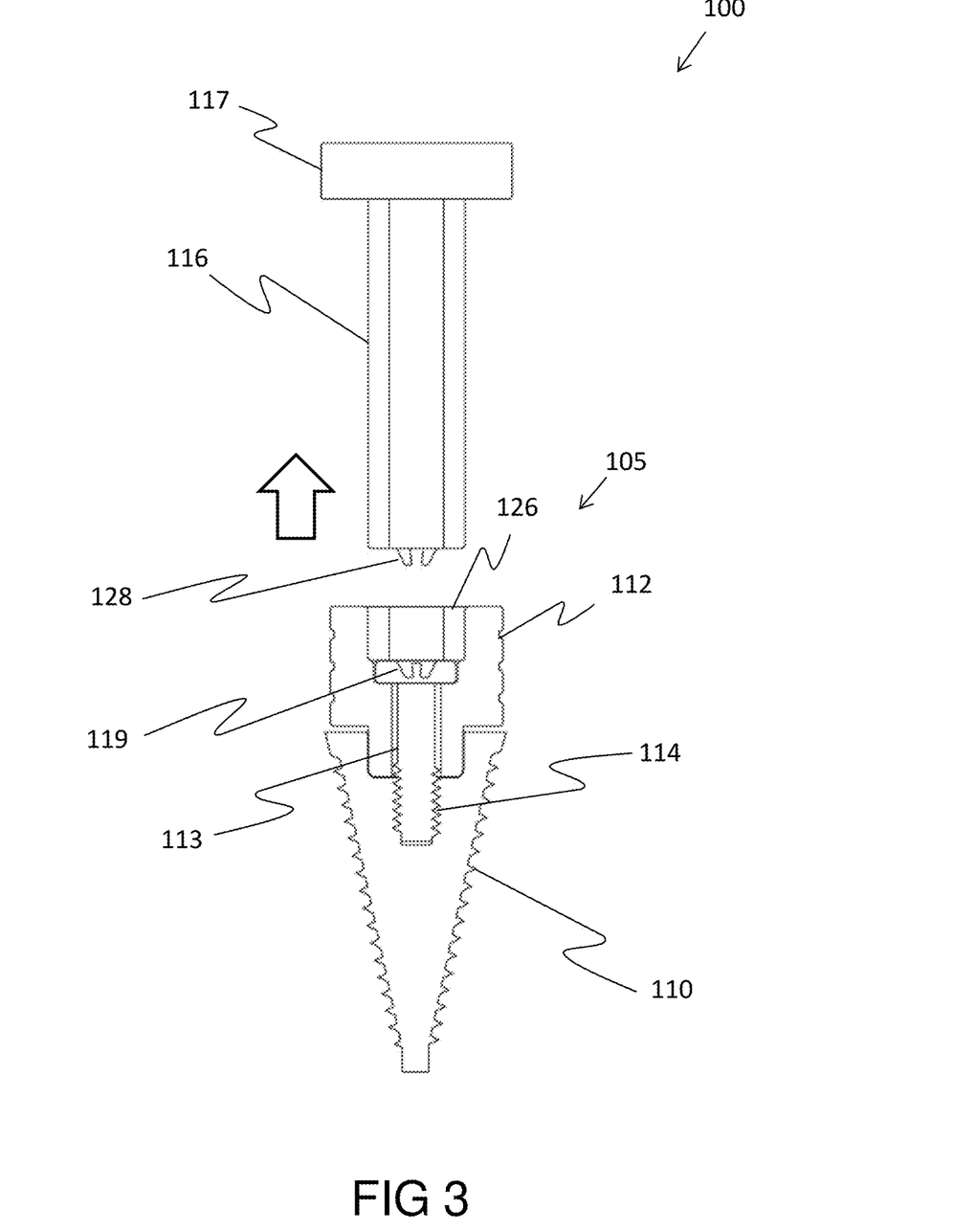

Reference is currently made to FIGS. 2 and 3, which are cross-sectional schematic representations of a one-time abutment system 100, in accordance with embodiments of the current invention. One-time abutment system 100 includes an abutment 105, which includes: an implant 110; a healing cap 112, the healing cap mechanically fixed to the implant by threaded bolt 113 extending axially through the healing cap and engaging a matching axially tapped socket 114 in the implant; and a driving tool 115, having a detachable connection 118 to the threaded bolt—as further described hereinbelow.

One-time abutment system is provided to a clinic in the configuration shown in FIG. 2 in a sterilized state and within a sterile enclosure (not shown in the figure), as known in the art. Driving tool 115 has a cross sectional shape 116 matching that of an axial depression 126 (ref FIG. 3) in healing cap 112, such as, but not limited to a hexagonal cross-section. The driving tool has a grasping end 117, characterized as an enlarged end part of the driving tool to allow the tool to be grasped and driven by a dental surgeon.

In the initial procedure, after being removed from the sterile enclosure, one-time abutment system 100 (with driving tool 115 attached, as described hereinabove) is used to insert the implant in place, the driving tool further used to drive the combined healing cap 112 and implant 110 into place. Referring to FIG. 3, once abutment 105 has been inserted and the implant driven into place, driving tool 115 is detached from the healing cap—as indicated by the arrow pointing upward. Detachment of the driving tool is accomplished by spring prongs 128 being released from mating depression 119 in the top of the threaded bolt, as shown in the figure and as described hereinbelow.

Detachable connection 118, which includes spring prongs 128 and mating depression 119, is configured to provide sufficient friction/force to maintain driving tool 115 being attached to the healing cap when one-time abutment system 100 is supplied to the clinic and used to position and drive the implant, but to allow the driving tool to be detached once the abutment, including implant 110, has been inserted in place. Embodiments of the current invention include the detachable connection having the spring prongs expanding slightly (i.e. being biased) against the mating depression to provide sufficient friction/force to maintain driving tool 115 attached to the healing cap, as described above. To detach the driving tool after the implant is in place, the spring prongs are detachable from the mating depression without exerting undo force. Once detached, driving tool 115 is disposed.

Figure 4:
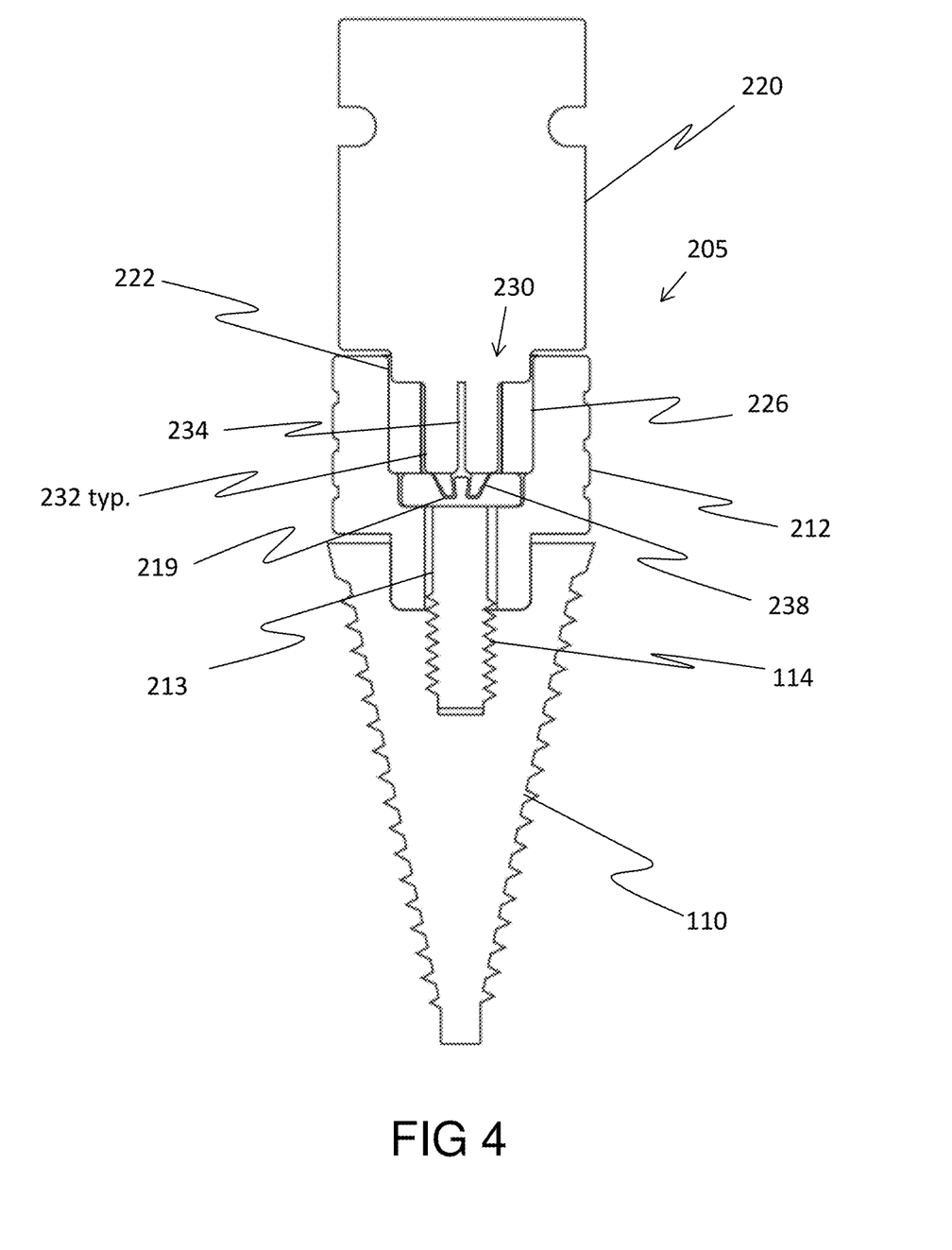
FIG. 4 is a cross-sectional schematic representations of the implant shown in FIGS. 2 and 3, an abutment (including the implant and an exemplary healing cap); and a transfer gauge, in accordance with embodiments of the current invention.

Reference is currently made to FIG. 4, which is a cross-sectional schematic representations of the implant shown in FIGS. 2 and 3, an abutment 205 (including the implant and a healing cap 212); and a transfer gauge 220, in accordance with embodiments of the current invention. Apart from differences described below, implant 110 and tapped socket 114 of FIG. 4 are identical in notation, configuration, and functionality to that shown in FIGS. 2-3, and elements indicated by the same reference numerals and/or letters are generally identical in configuration, operation, and functionality as described hereinabove.

Apart from differences described below, abutment 205, including the implant, a healing cap 212, and a threaded bolt 213 are identical in configuration and functionality to abutment 105, healing cap 112, and threaded bolt 113 shown in FIGS. 2-3, especially in the fact that exemplary healing cap 212 remains mechanically fixed to the implant by threaded bolt 213 extending axially through the healing cap and engaging the matching tapped socket 114 in the implant—all of which comprise abutment 205. Threaded bolt 213 has a mating depression 219 similar to mating depression 119 in threaded bolt 113 shown in FIGS. 2 and 3.

The configuration of implant 110, healing cap 212, and transfer gauge 220 shown in the current figure is characteristic of a procedure to produce an impression and then a mold of the dental zone and surroundings, typically performed a number of weeks following the initial procedure. A first step in the impression/mold procedure is to temporarily attach transfer gauge 220 to the healing cap using a detachable connection 230. Transfer gauge 220 has a lower axial extension 222 having a cross sectional shape matching that of an axial depression 226 in the healing cap (similar to axial depression 126 in healing cap 112 of FIGS. 2 and 3). Detachable connection 230 includes: spring prongs 232, separated by slot 234—both extending axially from lower axial extension 222, as shown in the figure—and terminating in spring prong ends 238, which mate with mating depression 219, when the transfer gauge is connected to the healing cap.

Embodiments of the current invention include the detachable connection having the spring prong ends expanding slightly (i.e. being biased) against the mating depression to provide sufficient friction/force to maintain transfer gauge 220 attached to the healing cap, similar to as described hereinabove regarding tool 115 and healing cap 112 in FIGS. 2 and 3. To detach the transfer gauge, the spring prongs ends are detachable from the mating depression without exerting undo force.

Production of the impression and a subsequently produced dental mold may be done in a mechanical/traditional process/procedure or in a computerized impression process/procedure—as described hereinbelow. In a mechanical/traditional procedure, the current figure and description hereinabove illustrate the configuration of the healing cap and the transfer gauge and the attachment (and subsequent detachment) of the transfer gauge to the healing cap (i.e. to the abutment). An additional, alternative configuration of the healing cap and the transfer gauge and a description of its use in the dental mold process is described hereinbelow. Other configurations are possible and are within the scope of embodiments of the present invention.

Figure 5:
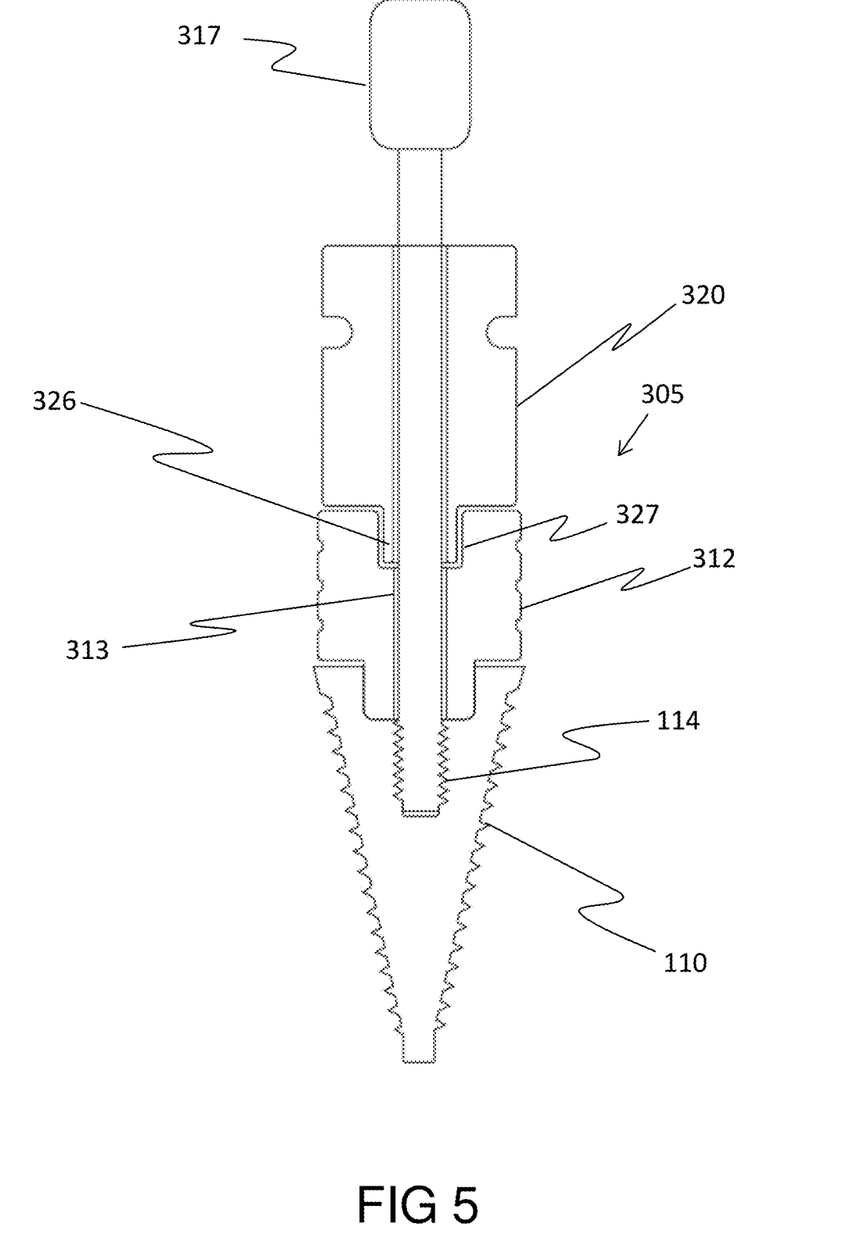
FIG. 5 is an alternative cross-sectional schematic configuration of the implant shown in FIGS. 2, 3, and 4, an abutment (including the implant and an exemplary healing cap); a retaining bolt; and a transfer gauge, in accordance with embodiments of the current invention.

Reference is currently made to FIG. 5, which is an alternative cross-sectional schematic configuration of the implant shown in FIGS. 2, 3, and 4, an abutment 305 (including the implant and an exemplary healing cap 312); a retaining bolt 313; and a transfer gauge 320, in accordance with embodiments of the current invention. Apart from differences described below, implant 110 and tapped socket 114 are identical in notation, configuration, and functionality to that shown in FIGS. 2-4, and elements indicated by the same reference numerals and/or letters are generally identical in configuration, operation, and functionality as described hereinabove.

Apart from differences described below, abutment 305, including the implant and exemplary healing cap 312 are identical in configuration and functionality to abutments 105 and 205, as shown, respectively in FIGS. 2-3 and FIG. 4 (being installed in the initial procedure. Retaining bolt 313 has an elongated shape and serves to mechanically fix the transfer gauge-and-healing cap configuration to the implant by threaded bolt 313 extending axially through the healing cap and engaging a matching tapped socket 114 in the implant as described further hereinbelow. Retaining bolt 313 has a driving end 317, characterized as an enlarged end part of the retaining bolt to allow the retaining bolt to be tightened and loosened. Transfer gauge 320 has an axial protrusion 326, matching an axial depression 327 in healing cap 312, as further described hereinbelow.

In the configuration shown in FIG. 5, while healing cap 312 is formed without the detachable connection (as shown in the healing cap of FIG. 4), healing cap 312 has a shape resembling that of healing cap 112, and axial depression 327 of healing cap 312 is likewise similar to axial depression 126 of healing cap 112, shown in FIGS. 2 and 3. Healing cap 312 is initially retained by threaded bolt 113 (shown in FIGS. 2 and 3) when the abutment, including the healing cap and implant, was initially inserted in the initial procedure.

When the impression procedure noted hereinabove commences, threaded bolt 113 (of FIGS. 2 and 3) is temporarily removed. Transfer gauge 320 (ref FIG. 5) is inserted into healing cap 312, with axial protrusion 326 mating into axial depression 327. Retaining bolt 313 is then inserted axially through the transfer gauge and the healing cap and the retaining bolt is engaged into tapped socket 114 (in similar fashion to the retention of threaded bolt 113, previously). Embodiments of the current invention include attaching bolt 313 having a plurality of lengths to compensate for different heights of various healing caps.

Continuing in the procedure to produce a mold using a mechanical impression process, and using either of the two exemplary configurations shown in FIGS. 4 and 5 hereinabove, a form (not shown in the figures) is filled with soft material is placed over the dental region, and the transfer gauge is effectively surrounded by the soft impression material. In the configuration shown in FIG. 5, driving end 317 is configured to protrude through the form, thereby allowing the bolt to be subsequently unscrewed and removed from the abutment. After the impression material hardens, the mold is removed from the dental region, and the transfer gauge is retained in the mold and detached from the abutment/healing cap. Finally, threaded bolt 113 is reinserted into the healing cap and the implant to retain the abutment, as shown in FIGS. 2 and 3.

Similarly, referring to the configuration shown in FIG. 4, when an impression is made, transfer gauge 220 is surrounded by the soft impression material and the transfer gauge becomes embedded in the hardened mold. Detachment of transfer gauge 220 takes places with removal of the hardened impression material and by using detachable connection 230, as described hereinabove. In both configurations of FIGS. 4 and 5, a mold of the dental zone is obtained with the transfer gauge imbedded in the mold and the healing cap is retained in the implant in the same configuration of the initial procedure (i.e. FIGS. 2 and 3). The mold is used in the laboratory to create a dental model of the region as known in the art.

Alternatively or optionally, embodiment of the current invention using a computerized impression process are applicable to the descriptions above of FIGS. 4 and 5, as described hereinbelow. A scanning operation of the dental zone is performed several times, at first without the transfer gauge (also referred to hereinbelow as "scan pin") in position and then with the scan pin in position as shown in FIGS. 4 and 5. An exemplary intraoral scanner, such as CS 3600 by Carestream Dental, LLC, and an appropriately-programmed computer are used for this operation. The scanned images are processed to yield a complete digital model of the dental zone, which includes s representation of the implant in its correct position and orientation. During processing, a virtual healing cap (i.e. a digital representation of the healing cap) is included in processing to indicate the exact position of the implant in the model.

It will be appreciated that the clinical impression procedure, of any configuration described hereinabove, is generally similar to a corresponding mechanical conventional procedure, except that in embodiments of the current invention, the healing cap is retained in place upon the implant, following the initial procedure, thus avoiding the various disadvantages enumerated above, resulting from removal and replacement of the healing cap.

It is noted that the laboratory procedure to create a model from the obtained mold (mechanical process) or digital representation (computerized process) must be modified in that a certain dimension equal to the length of the healing cap, which must be added to the end of the retained transfer gauge or the scan pin representation—to indicate the position of the implant (or of an implant analog), as known in the art. Healing caps, including those of the novel design according to embodiments of the current invention, are fabricated in various sizes for clinical use.

As such, the length of a healing cap (and therefore its analog) used in the model creation process is communicated to the laboratory and is usually known from the clinical records. For added convenience and security, embodiments of the current invention optionally include the length of each healing cap to be encoded thereupon, for example as a given color. More specifically, the healing cap may be supplied having different colors indications, with each color corresponding to a particular length of the healing cap. Optionally or alternatively, a healing cap may also bear a second color indication to indicate (or encode) a width dimension of the healing cap. Such color encoding is particularly advantageous for the impression procedures described hereinabove, to obviate the need to rely on clinical records for obtaining the size data. (In prior-art procedures, the removed healing cap is directly measured to obtain dimensional information.) Using color-encoded healing caps, the healing cap dimensions sizes are readily identified by the practitioner during the impression procedure and are easily communicated to the laboratory, to identify appropriate healing cap analogs for the model construction as described above. In the case of computerized impression, identification of color encodings may be done by pattern/color recognition, as known in the art.

Figure 6:
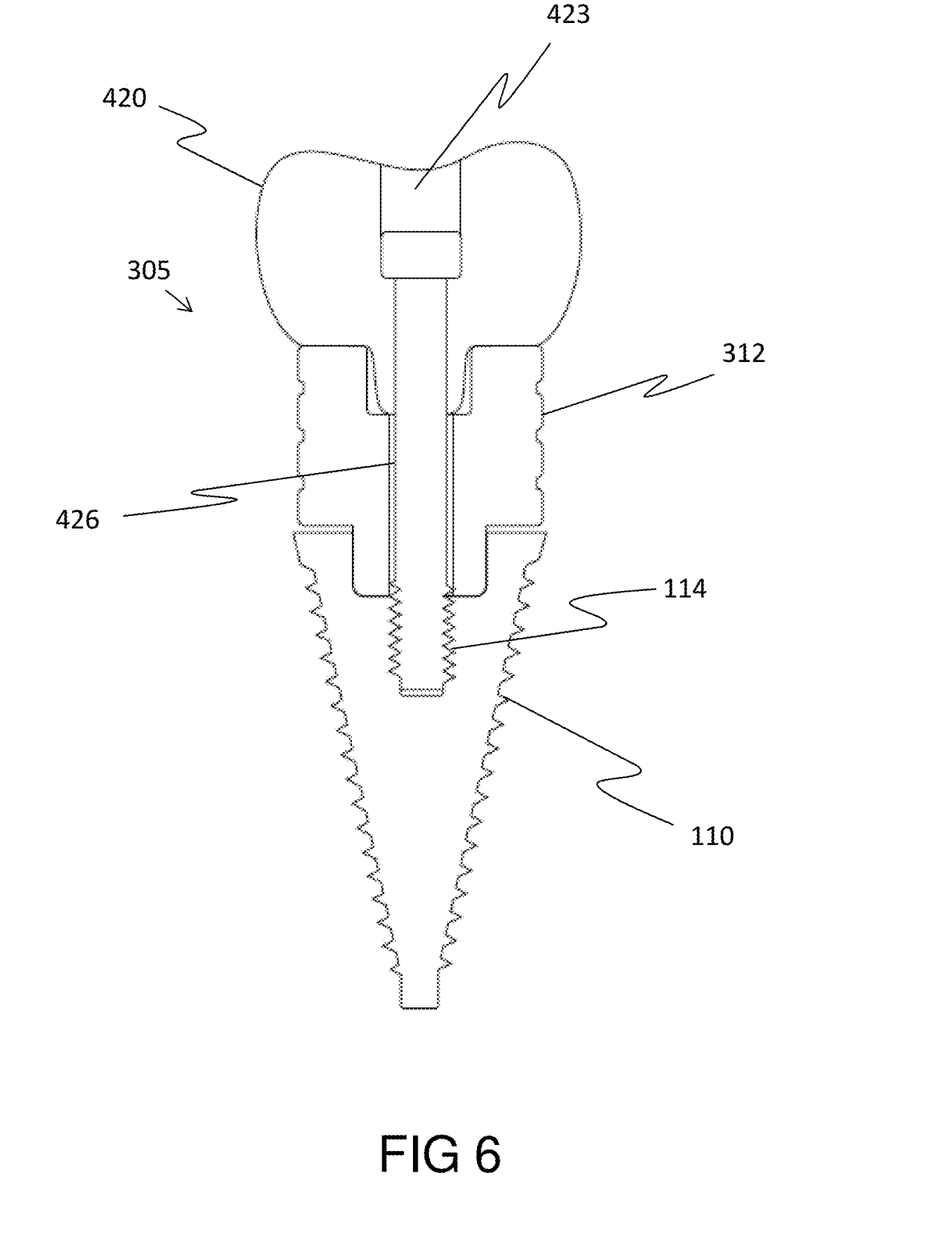
FIG. 6 is a cross sectional, schematic representation of a superstructure mounted upon an abutment, in accordance with embodiments of the current invention.

Reference is currently made to FIG. 6, which is a cross sectional, schematic representation of a superstructure 420 mounted upon abutment 305, in accordance with embodiments of the current invention.

Apart from differences described below, implant 110 and tapped socket 114 are identical in notation, configuration, and functionality to that shown in FIGS. 2-5, and elements indicated by the same reference numerals and/or letters are generally identical in configuration, operation, and functionality as described hereinabove. Also, apart from differences described below, abutment 305, including the implant and healing cap 312, is identical in configuration and functionality to abutments 105, 205, and 305 shown, respectively in FIGS. 2-3, FIG. 4, and FIG. 5—all having been installed in the initial procedure, and elements indicated by the same reference numerals and/or letters are generally identical in configuration, operation, and functionality as described hereinabove.

Following preparation in the laboratory, as described hereinabove and as known in the art, superstructure 420, typified as a crown or a bridge, is fabricated to dimensionally match the abutment. Threaded bolts 113 and 213 (ref FIGS. 2-4) are removed from the abutment, the crown is inserted onto the abutment, and retaining threaded bolt 423 is introduced into recession 423 of the exemplary crown (i.e. superstructure 420) the retaining threaded bolt engaging tapped socket 114 and tightened, to secure the crown in place upon the abutment.

As is described hereinabove, the abutment—once installed in an initial procedure—remains in place throughout any intermediate procedures and through a final procedure of installing the superstructure/crown in place upon the abutment.

It will be appreciated that the above descriptions are intended only to serve as examples, and that many other embodiments are possible within the scope of the present invention as defined in the appended claims.

The invention claimed is:

1. A method of using a tissue level one-time abutment system in a dental region, the one-time abutment system having an abutment supporting a superstructure, the method including the steps of:
   a. providing the one-time abutment system, comprising:
      an implant; and
      a healing cap mechanically fixed to the implant by a threaded bolt extending axially through the healing cap and secured into a matching tapped socket in the implant;
   b. providing the one-time abutment system to a clinic in a sterilized state with a driving tool attached to the healing cap, the driving tool having a cross sectional shape matching an axial depression in the healing cap and the driving tool attached to the threaded bolt and having a detachable connection to the threaded bolt;
   c. inserting the one-time abutment system in the dental region in an initial procedure, with the healing cap retained in place on the implant following the initial procedure;
   d. using the driving tool to drive the healing cap and implant into place, in the initial procedure, using the cross-sectional shape of the driving tool matching an axial depression in the healing cap;

e. detaching the driving tool from the healing cap once the one-time abutment system is inserted and the implant is driven into place;
f. disposing the driving tool after it is detached;
g. temporarily attaching a transfer gauge to the healing cap for a first step in an impression procedure including hardening impression material;
h. detaching the transfer gauge from the healing cap with removal of the hardened impression material; and
i. retaining the healing cap in place, the healing cap serving as an integral part of the abutment throughout all intermediate procedures and through a final procedure of installing the superstructure in place upon the abutment.

2. The method of claim 1, whereby a chair time is reduced by insertion of the implant and mounting the healing cap together, in a same one-time procedure, and the healing cap is retained in place upon the implant and the healing cap is not removed and replaced, to reduce costs and to increase success of dentistry procedures.

\* \* \* \* \*